United States Patent

Kleine et al.

[11] Patent Number: 6,065,908
[45] Date of Patent: May 23, 2000

[54] DRILL

[75] Inventors: Werner Kleine, Achim; Hans-Werner Bongers-Ambrosius, Munich, both of Germany

[73] Assignee: Hilti Aktiengesellschaft, Schaan, Liechtenstein

[21] Appl. No.: 09/264,351

[22] Filed: Mar. 8, 1999

[30] Foreign Application Priority Data

Mar. 10, 1998 [DE] Germany .......................... 198 10 192

[51] Int. Cl.[7] .............................. B23B 51/02; E21B 10/36
[52] U.S. Cl. ........................ 408/67; 175/415; 175/418; 408/144; 408/226
[58] Field of Search ............................... 408/67, 144, 57, 408/226, 227; 175/415, 417, 418, 435, 209, 211

[56] References Cited

U.S. PATENT DOCUMENTS

| | | | |
|---|---|---|---|
| 2,802,642 | 8/1957 | Feucht | 175/418 |
| 4,190,128 | 2/1980 | Emmerich | 175/415 |
| 4,243,113 | 1/1981 | Kleine | 175/417 |
| 4,515,230 | 5/1985 | Means et al. | 175/418 |
| 4,964,476 | 10/1990 | Fischer | 408/67 |
| 5,234,294 | 8/1993 | Hoppe et al. | 408/67 |

FOREIGN PATENT DOCUMENTS

90/02244  3/1990  WIPO ...................................... 408/67

OTHER PUBLICATIONS

Machine Design, Theory and Practice, Aaron D. Deutschman et al. Macmillan Publishing Company, Inc., pp. 833–836, 1975.

*Primary Examiner*—Daniel W. Howell
*Attorney, Agent, or Firm*—Brown & Wood, LLP

[57] ABSTRACT

A drill for forming bores in constructional components and including a tubular stem (2; 22; 32; 42) having an axially extending through-channel (3; 23; 33; 43) which opens into at least one suction opening (7; 11; 27; 37; 47), a shank (5) provided at a rear end of the stem for connecting the drill to a drilling tool (M), and a drilling head (8; 28; 38; 48) having lips (9; 29; 39; 49) and formed entirely of a cutting material and substantially butt-joined to the stem (2; 22; 32; 42) at a free front end of the stem (2; 22; 32; 42), with at least one suction opening being formed by a mouth opening of a front channel (12; 26; 36; 46) which is limited, at least partially by a material of the drilling head (8; 28; 38; 48) and a mouth surface of which, at least partially is arranged in a circumferential region of at least one of the stem (2; 22; 32; 42) and the drilling head (8; 28; 38; 48).

14 Claims, 2 Drawing Sheets

DRILL

BACKGROUND OF THE INVENTION

1. Field of the Invention

The present invention relates to a drill for forming bores in constructional components made of stone, concrete, break and the like and including a tubular stem having an axially extending through-channel which opens into suction opening, a shank provided at a rear end of the stem for connecting the drill to a drilling tool, and a drilling head provided with lips and formed entirely of a cutting, preferably, hard material and secured at a front end of the stem opposite to the rear end.

2. Description of the Prior Art

In addition to known drills for forming bores in constructional components of stone, concrete, break and the like, in which the drillings, which are formed during the drilling process are removed through at least one helical groove provided on a drill stem, in the past, so-called suction drills were used. They represent a drill with an axial bore which is connected with a vacuum-producing apparatus, in particular a vacuum dust collector, by an adapter and a coupling element. A suction drill should insure a high drilling capacity as a result of sucking of the drillings, which are formed during the drilling process, away and should provide for better cleaning of the bore. Such a suction drill is disclosed, e.g., in a German document DE-A-27 57 140. The known suction drill has a stem provided with an axial bore and having its end inserted in an adapter which is surrounded by a coupling element and, at the opposite end of the stem, a drilling head with a hard metal plate-like bit is releasably screwed in the stem. The suction bore is connected with a bore provided in the drilling head and which opens on opposite sides of the plate-like bit. The suction bore is connected, via the adapter and the coupling element, with a vacuum dust collector. During the drilling process, the formed drillings are transported away through the drilling head and the suction bore to the vacuum dust collector.

The known suction drill has a replaceable drilling head which is screwed in the stem. The drilling head is replaced upon wear of the hard metal bit or clogging of the mouth openings. When the known suction drill is used with a hammer drilling tool, the large single-blow energy of an axial impact results in an excessive loading of the helical thread in the stem and of the drilling head thread. The large single-blow energy of the axial impacts can lead to an excessive wear of both threads and, as a result, the connection of the drilling head with the stem is weakened. On the other hand, as a result of rotation of the drill during the drilling operation, the thread connection between the drilling head and the stem is so tightened that a very large force is required to unscrew the drilling head, if necessary, or that the drilling head cannot be unscrewed at all. Besides, the manufacturing of the known suction drill is rather expensive. Furthermore, the formation of an axial bore in a stem, which is made of a relatively long steel bar, sets high demand to the manufacturing technology.

To eliminate the drawbacks of the known suction drill and to facilitate its manufacturing, German Utility Model DE-U-79 08 923 proposed to form the drill stem of a steel sleeve. In the proposed suction drill, an end of the sleeve-shaped stem is connected with an adapter which is surrounded by a non-rotatable coupling element connected, e.g., with a vacuum dust collector. The adapter is also equipped with a shank which forms an axial extension of the stem and serves for connecting the drill with a drilling tool. The steel sleeve is provided at its opposite end with axial slots forming a cross-like pattern. A one-piece sintered cross-shaped bit formed of a hard metal is pushed into the axial slots and is secured there. The shape of the bit and the inner diameter of the sleeve-shaped stem are so selected that openings remain between the lips of the bit and the inner wall of the stem, which are connected with the axial channel formed in the stem.

The drill, which is disclosed in the German Utility Model De-U-79 08 923, has a relatively small stability in the region of the drilling head. The one-piece sintered cross-bit is supported only in the axial slots. The shearing forces, which are generated during the rotary-percussion drilling of a constructional component, act almost entirely on the cross-bit. As a result, the cross-bit can separate from slots, or the hard metal can burn out. The shape of the lips arranged in a cross-like pattern is so selected that, as it has already been discussed above, open regions remain between the lips and the stem inner wall.

These open regions extend along the axial channel or bore formed in the stem. The lips have a strip-like shape and have a height which increases toward the cross-shaped region. In this way, separate lips form, in the cross-shaped region, cutting points which span the axial channel without any support. During the drilling process, the projecting cutting points are subjected to a very large load as a result of application of axial blows. The shape of the cross-bit, in particular in connection with the use of the drill with a hammer drilling tool which is characterized, as discussed above, by a high single-blow energy of the axial impacts, can result in breaking of the one-piece sintered cross-bit. As it has also been discussed above, the openings, which are limited by the bit and the stem inner wall, are axially oriented. During the drilling process, the end of the drilling head can become completely submerged in the drillings. In this case, the suction action becomes insufficient for a quick removal of the drillings, and the opening could become clogged.

Accordingly, an object of the present invention is to eliminate the drawbacks of a suction drill disclosed in the prior art. Another object of the present invention is to provide a drill having a tubular stem and a sintered drilling head which is formed entirely of a cutting material, preferably, of hard metal. A yet another object of the present invention is to provide a drill in which clogging of the suction openings, which communicate with the stem through-channel, with the drillings is prevented.

A still further object of the present invention is to provide a drill in which the attachment of the drilling head can be effected in a simple and reliable way.

SUMMARY OF THE INVENTION

These and other objects of the present invention, which will become apparent hereinafter, are achieved by providing a drill for forming bores in constructional components made of stone, concrete, break and the like and including a tubular stem having an axially extending through-channel which opens into suction openings. A shank is provided at a rear end of the stem for connecting the drill to a drilling tool. A drilling head having lips and formed entirely of a cutting material, preferably, a hard metal is substantially butt-joined, preferably by welding or soldering to the stem at the free front end of the stem. At least one of the suction openings is formed by a mouth opening of a front channel, which is limited, at least partially, by the material of the drilling head. The mouth surface of the front channel is arranged, at least partially in a circumferential region of the stem and/or the drilling head.

Because the drill has at least one front channel a greater part of the mouth surface of which is arranged in the circumferential region of the stem and/or the drilling head, the suction opening cannot be easily clogged during the drill operation. The suction opening, which is formed by the mouth opening of the front channel, is located outside of the region of the engagement of the lips with the structural component and does not become immediately submerged into the removable drillings or drilling dust. This prevents clogging of the suction opening or openings with drillings at the start of the drilling process when, e.g., the suction power is not yet high enough. However, the suction opening, which is limited by the material of the drilling head, remains sufficiently close to the bottom of a drilled bore to insure a reliable removal of drillings formed during a drilling process by vacuum produced during the drilling process. The sidewise orientation of the mouth opening toward the annular space, which is formed during the drilling process, prevents the not sufficiently comminuted material from blocking the suction opening as this material does not lie in front of the suction opening. In this way, only drillings, which has sufficiently been comminuted by the lips, reach the suction opening. Because the drilling head is substantially butt-joined with the stem, the mounting of the drilling head is effected relatively quickly. The attachment of the drilling head to the front end of the stem is effected, preferably, by welding or soldering. Both attachment methods have proved themselves since long ago and insure the necessary retention of the drilling head on the stem.

For insuring a trouble-free operation of a drill according to the present invention to a most possible extent, it proved to be advantageous when more than two-third of the mouth surface of the front channel is located in the circumferential region of the stem and/or the drilling head.

In order to even better prevent clogging of the suction opening, advantageously, the front channel is oriented in a direction toward the outer surface of the stem or toward the axial side surface of the drilling head and forms with the longitudinal axis of the stem an angle smaller than 90°, preferably, an angle amounting to from 10° to 70°. The front channel is formed, preferably, by recessing the outer surface of the stem and/or the drilling head. Thereby, the mouth opening is formed automatically upon joining of the drilling head and the stem, and any further finishing operation can be eliminated. The recess can be formed in the end surface of the stem or by shaping of the drilling head in a particular manner so that after joining of the drilling head with the stem, the front channel is formed. After the drilling head is formed, usually by a powder metallurgical process by a sintering technique, many different ways of shaping the drilling head are available. Thus, it is possible to form a recess in the drilling head after the sintering process, e.g., by recessing the side surface or surfaces. It is also possible to form one or more bores in the drilling head.

Preferably, the cross-sectional surface of the mouth opening of the front channel is smaller than the cross-sectional surface of the stem through-channel and amounts to from about 30% to 70% of the cross-sectional surface of the through-channel. In case several front channels with mouth openings are provided, advantageously, the sum of the cross-sectional surfaces of all mouth openings is smaller than the cross-section of the through-channel. The larger cross-section of the through-channel prevents sucking of drillings the diameter of which is larger than the diameter of the through-channel. Thereby, clogging of the through-channel is prevented to a most possible extent. In a worst case scenario, one of the mouth openings can become clogged for a very shot period of time. Because of the cross-sectional relationships, such a clogging, however, can take place only in the vicinity of the mouth openings and is simply eliminated, e.g., by pushing the removed bore material into the wider through-channel. For pushing the waste material, a needle or a hook can be used. The selected relationship between the cross-section of the mouth opening or openings and the cross-section of the through-channel permits to provide a sufficiently high vacuum in the bore which insurers immediate removal of the drillings through the drill stem. This prevents clogging of the through-channel with drillings in case an excess amount of the drillings is sucked in which could not be removed sufficiently rapidly.

The front channel and/or the stem through-channel need not necessarily have a circular from. E.g., the cross-section, if necessary, can be made oval, elliptical, polygonal, ets . . . . In case a non-circular cross-section becomes necessary, if required, providing a locally larger joint surface on the stem for butt-joining with the drilling head is justified.

Alternatively to a non-circular cross-section of the through-channel or in combination with a non-circular cross-section of the through-channel, the stem can also have a non-circular circumferential contour. By arbitrary shaping the circumferential contour of the stem, the shape of the drilling head can be optimized. Simultaneously, as large as possible joining surface can be provided.

According to one embodiment of the present invention, the through-channel has, at least in the front section of the stem, a polygonal cross-section, and the drilling head has, at its end opposite the lips, an axial extension the circumferential contour of which corresponds, at least regionwise, to the cross-section of the through-channel. E.g., the cross-section of the through-channel can have a shape for a regular hexagon, and the axial extension can be formed as a corresponding hexagonal stub. Upon attachment of the drilling head, the hexagonal extension is received in the through-channel and is held therein without a possibility of rotation relative to the stem. The axial extension of the drilling head is not connected with the stem either by soldering or by welding, or by frictional forces. Because the outer contour of the axial extension corresponds to the cross-section of the through-channel to the most possible extent, the resulting torsional coupling between the drilling head and the shaft takes up the major portion of the shearing forces, which are generated during the drilling operation and transmits them to the stem. Thereby, the joint surface between the drilling head and the stem, which is obtained, e.g., by welding or soldering, is relieved from these forces, and the shearing of the drilling head is largely prevented.

Because the number of suction openings corresponds to the number of lips on the drilling head, and each suction opening is spaced from its respective leading, in the rotational direction, lip by an angular distance of less than 90° during the operation, the formed drillings are sucked directly behind the lip. In case of a short-time blocking of one of the suction openings, the vacuum provided at the other openings reliably insures suction of drillings.

According to another embodiment of the present invention, the drilling head has three lips spaced from each other by an angular distance from about 90° to about 180° preferably, 120°. Such a drilling head is characterized by an uniform engagement with the material of the constructional component and by good penetration into the formed bore.

In accordance with further advantageous embodiment of the invention, the stem of a drill with a three-lip drilling head has, at least in its front region, a polygonal circumferential contour. The drilling head has a widened base which substantially coincides with the outer surface of the stem. The lips form with the side surfaces of the base an angle of about 90°±10°. The selected geometry of the three-lip drilling head and the polygonal front section of the stem provide for optimal joining surfaces for effecting a butt-joined connection of the drilling head with the stem.

BRIEF DESCRIPTION OF THE DRAWINGS

The features and objects of the present invention will become more apparent, and the invention itself will be the best understood from the following detailed description for the preferred embodiments when read with reference to the accompanying drawings, wherein.

DETAILED DESCRIPTION OF THE PREFERRED EMBODIMENTS

Figure 1:
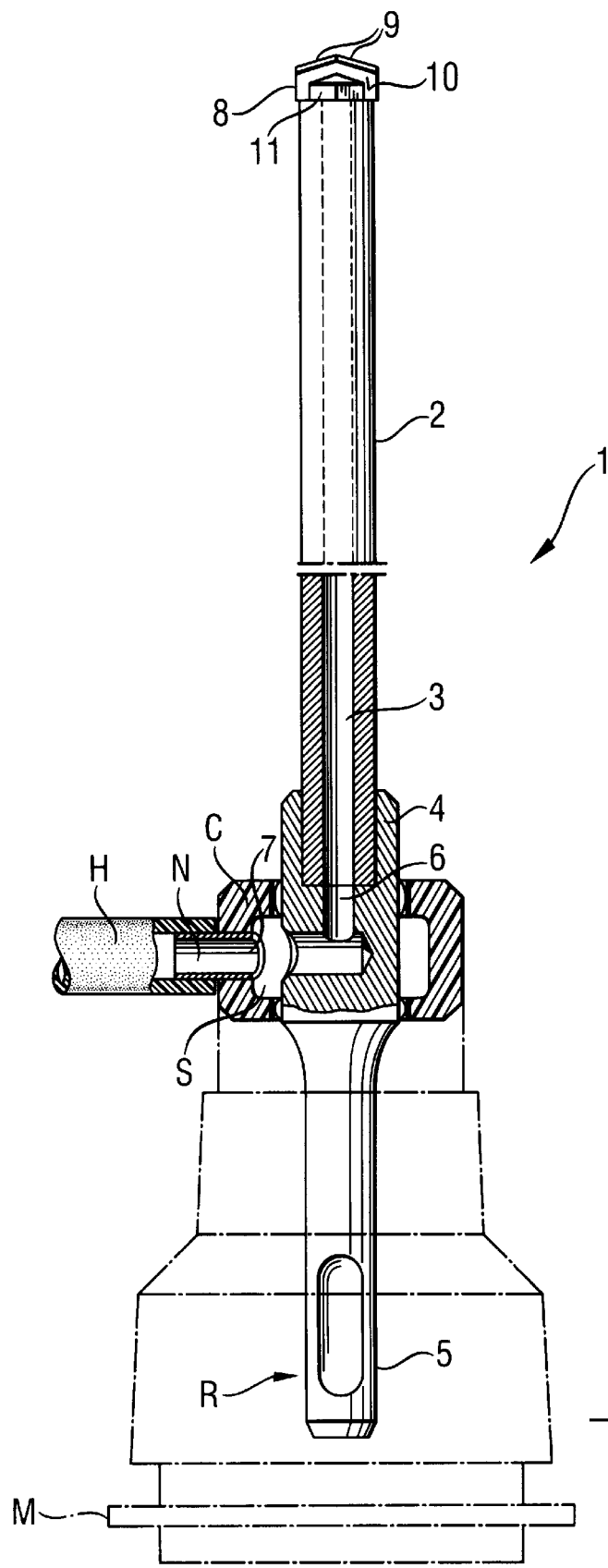
FIG. 1 shows a side elevation, partially cross-sectional view of a drill according to the present invention received in a chuck of a hammer drilling tool.

FIG. 1 shows a drill according to the present invention and generally designated with a reference numeral 1, which is received in a chuck R of a drilling tool M, e.g., a hammer drilling tool. The drill 1 has a tubular stem 2 with a through-channel 3. One end of the tubular stem 2 is connected, e.g., is welded or soldered to a connection element 4 having a shank 5 which is received in the chuck R of the drilling tool M, connecting the drill 1 with the drilling tool M. The through-channel 3 of the tubular stem 2 is connected with a bore 6 in the connection element 4 which opens into an opening 7 formed on the circumference of the connection element 4. The drilling tool M has a non-rotatable coupling element C, which forms an extension of the chuck R. The coupling element C has an annular space S connected with the mouth opening 7 of the bore 6. The annular space S opens into a connection nipple N to which a suction hose H is connected.

A drilling head 8 is provided at an end of the tubular stem 2 opposite the end of the stem 2 connected with the connection element 4. The drilling head 8 is formed entirely of a cutting material, e.g., a hard metal. The drilling head 8 is butt-joined to the front end of the tubular stem 2 and is permanently connected with the stem 2 by, e.g, welding or soldering. In the region of the drilling head 8, the through-channel 3 is connected with two suction openings 11 which are formed by mouth openings of two channels provided in the drilling head 8 in the butt-joint region of the drilling head 8 with the stem 2. FIG. 1 shows only one of the suction openings 11 which are formed by recesses provided in side surfaces 10 of the drilling head 8. The second opening 11 in FIG. 1 is provided on a side of the drill 1 remote from a viewer.

Figure 2:
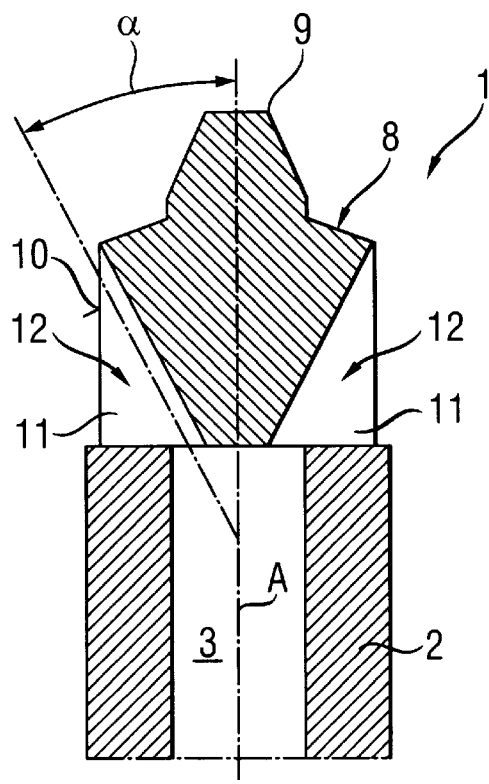
FIG. 2 shows a cross-sectional view of a front portion of the drill shown in FIG. 1.

FIG. 2 shows an axial cross-section of the front section of the stem 2 of a drill according to the present invention in a position pivoted by 90° with respect to the position shown in FIG. 1. The two suction openings 11, which are formed by mouth openings of the two channels 12 provided in the drilling head 8, are arranged on opposite surfaces of the drilling head 8 and are offset axially backward with respect to the lips 9 of the drilling head 8. The channels 12 extend at an angle toward the axis A of the stem 2 or the through-channel 3. This insures that the mouth openings are oriented to the side surfaces 10 of the drilling head 8 or to the outer surface of the stem 2. The inclination angle α of the channels 12 amounts to from 10° to 70°. As shown in the drawing, the cross-sectional surface of the channels 12 is smaller than the cross-sectional surface of the through-channel 3. Preferably, the cross-sectional surface of the channels 12 amounts to from about 30° to about 70% of the cross-sectional surface of the through-channel 3. A large portion of the mouth area of the head channels 12 is located in the region of the circumference of the stem 2 or the drilling head 8.

Figure 3:
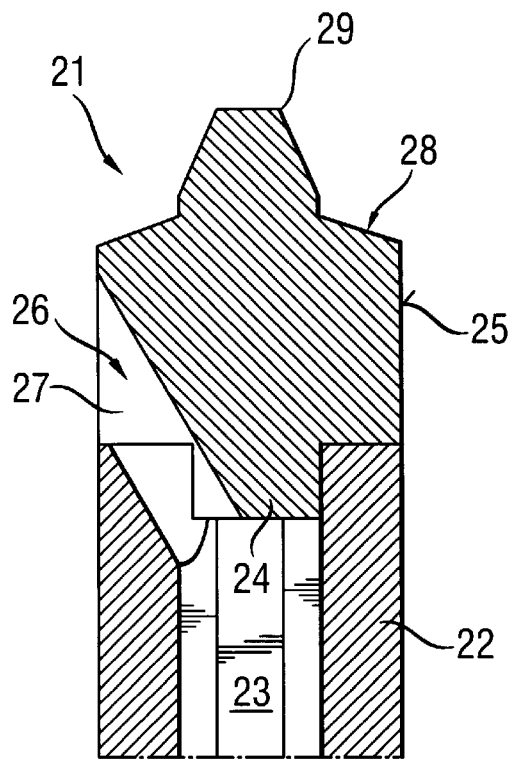
FIG. 3 shows a cross-sectional view of a front portion of another embodiment of a drill according to the present invention.

FIG. 3 shows another embodiment of the drill according to the present invention which is generally designated with a reference numeral 21. As shown in FIG. 3, the drilling head 28, which is provided with lips 29, has, at its end opposite the lips 28, a journal-like axial extension 24 which is embedded into the through-channel 23 in the front section of the stem 22. The through-channel 23 has, at least in the front section of the stem 22, a cross-section which deviates from a circular cross-section. E.g., the cross-section of the through-channel 23 is in the front section of the stem 22 can have a hexagonal contour. The outer contour of the axial extension 24 of the drilling head 28 corresponds to the cross-section of the through-channel 23 in the front section of the stem 22. This provides for additional retaining of the drilling head 28, which is secured to the front section of the stem 22 by, e.g., welding or soldering, in the through-channel 23 for joint rotation of the drilling head 28 with the stem 22.

As shown in FIG. 3, only one channel 26 is formed in the drilling head 28 the mouth opening of which forms the suction opening 27. The channel 26 is provided in the joint region of the drilling head 28 with the stem 22. The channel 26 is formed by a recess provided in a side surface 25 of the drilling head 28 and in the front section of the stem 22. The suction opening 27 is offset axially backward with respect to the lips 29. The channel 26 extends at an angle toward the through-channel 23 and is oriented in a direction of the side surface 25 of the drilling head 28.

Figure 4:
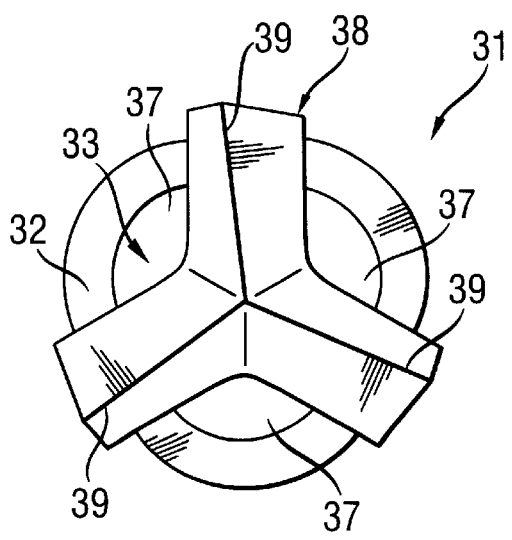
FIG. 4 shows a plan view of the drilling head of yet another embodiment of a drill according to the present invention.

FIG. 4 shows a plan view of yet another embodiment of a drill according to the present invention provided with a drilling head at the front end of a tubular stem and designated generally with a reference numeral 31. The tubular stem 32 has a non-circular, approximately polygonal contour. The cross-section of the through-channel 33 corresponds to a most possible extent to the circumferential contour of the stem 32. The drilling head 28, which is butt-joined to the front end of the stem 32, has three lips 39 angularly spaced from each other by an angle of about 120°. The lips 39 extend toward the outer surface of the stem 32 at angle of about 90°±10°. The number of suction openings 37 corresponds to the number of lips 39. The suction openings 37 are so arranged that with the rotatable drill 31, the angular distance between a leading lip 39 and an immediately trailing it, suction opening 37 is less than 90°.

Figure 5:
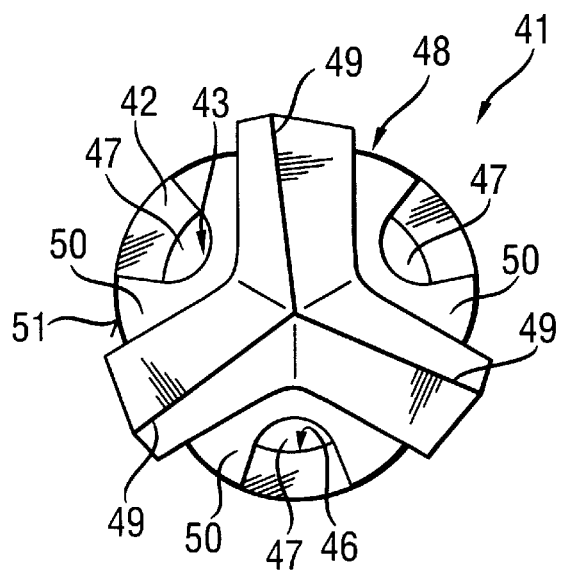
FIG. 5 shows a plan view of a further embodiment of a according to the present invention with a drilling head which is modified in comparison with the drilling head shown in FIG. 4.

FIG. 5 shows a plan view of a further embodiment of a drill according to the present invention which is generally designated with reference numeral 41. The drill 41 has a drilling head 48 with three lips 49. The tubular stem 42 of the drill 41 has a non-circular contour and a through-channel 43 having a substantially polygonal cross-section. The three lips 49 are arranged relatively to each other at an angle of 120°. A suction opening 47 is associated with each lip 49. For increasing the joining surface with which the drilling head 48 is connected with the stem 42, e.g., by welding or soldering, the drilling head is provided, at its end remote from the lips 49, with a head base 50. In the head base 50, there are provided recesses which form channels 46. The head base 50 has side surfaces 51 the projection of which coincides with the circumferential contour of the stem 42 to a most possible extent. In this manner, the size of the joining surface for a permanent connection of the drilling head 48 with the stem 42 is optimized.

The drill according to the present invention was described as a suction drill. However, it should be understood that a reverse application of the drill is also possible. E.g., the stem through-bores, together with their mouth openings, can be used for rinsing a bore with air or be used for delivering a drilling fluid.

Though the present invention was shown and described with references to the preferred embodiments, various modifications thereof will be apparent to those skilled in the art and, therefore, it is not intended that the invention be limited to the disclosed embodiments or details thereof, and departure can be made therefrom with the spirit and scope of the appended claims.

What is claimed is:

1. A drill for forming bores in constructional components, comprising a tubular stem (2; 22; 32; 42) having an axially extending through-channel (3; 23; 33; 43) which opens into at least one suction opening (7; 11; 27; 37; 47); a shank (5) provided at a rear end of the stem for connecting the drill to a drilling tool (M); and a drilling head (8; 28; 38; 48) having lips (9; 29; 39; 49) and formed entirely of a cutting material and substantially butt-joined to the stem (2; 22; 32; 42) at a free front end of the stem (2; 22; 32; 42), the at least one suction opening being formed by a mouth opening of a front channel (12; 26; 36; 46) which is limited, at least partially by a material of the drilling head (8; 28; 38; 48) and a mouth surface of which, at least partially is arranged in a circumferential region of at least one of the stem (2; 22; 32; 42) and the drilling head (8; 28; 38; 48).

2. A drill according to claim 1, wherein the drilling head is formed of the hard metal and is one of welded and soldered to the stem (2; 22; 32; 42).

3. A drill according to claim 1, wherein more than two-thirds of the mouth surface of the front channel (12; 26; 36; 46) is arranged in the circumferential region of the at least one of the stem (2; 22; 32; 42) and the drilling head (8; 28; 38; 48).

4. A drill according to claim 1, wherein the front channel (12; 26) is oriented in a direction toward one of an outer surface of the stem (2; 22) and an axial side surface (10, 25) of the drilling head (8; 28) and forms with a axis (A) of the stem (2; 22) an angle ($\alpha$) which is smaller than 90°.

5. A drill according to claim 4, wherein the front channel (12; 26) forms with the axis (A) of the stem (2; 22) an angle ($\alpha$) which lies in a range from 10° to 70°.

6. A drill according to claim 1, wherein the mouth opening of the front channel (10) has a cross-section which is smaller than a cross-section of the through-channel (3; 23; 33; 43).

7. A drill according to claim 6, wherein the cross-section of the mouth opening (10) amounts to from 30% to 70% of the cross-section of the through-channel (3; 23; 33; 43).

8. A drill according to claim 1, wherein at least one of the front channel and the through-channel of the stem has a non-circular cross-section.

9. A drill according to claim 1, wherein the stem (22; 32; 42) has non-circular circumferential contour.

10. A drill according to claim 1, wherein the through channel (23) has, at least in a front section of the stem (22) a polygonal cross-section, and the drilling head (28) has, at an end thereof opposite the lips (29) an axial extension (24) the circumferential contour of which corresponds, at least regionwise to the cross-section of the through-channel (23), whereby the drilling head extension (24) is retained in the through-channel (23) without a possibility of rotation relative thereto.

11. A drill according to claim 1, comprising a plurality of suction openings (37; 47) a number of which corresponds to a number of the lips (39, 49) provided on the drilling head, and wherein an angular distance between a leading, in a rotational direction, lip and an immediately trailing it, suction opening is less than 90°.

12. A drill according to claim 1, wherein the drilling head (38; 48) has three lips (39, 49) angularly spaced from each other by an angle lying in a range from about 90° to about 180°.

13. A drill according to claim 12, wherein the three lips (39; 49) are angularly spaced from each other by an angle of 120°.

14. A drill according to claim 12, wherein the stem (42) has, at least in a front section thereof, a polygonal contour, and wherein the drilling head (48) has a lip-supporting widened head base (50) having side surfaces (51) which coincide with outer surfaces of the stem (42), the lips (49) forming with the side surfaces (51) of the head base (50) an angle of about 90°±10°.

\* \* \* \* \*